(12) United States Patent
Gilan et al.

(10) Patent No.: US 11,858,211 B2
(45) Date of Patent: Jan. 2, 2024

(54) SYSTEMS FOR MATERIAL DEPOSITION

(71) Applicant: IO Tech Group Ltd., London (GB)

(72) Inventors: Ziv Gilan, Kfar-harif (IL); Daniel Liptz, Jerusalem (IL)

(73) Assignee: IO Tech Group Ltd., Hamaayan (IL)

( * ) Notice: Subject to any disclaimer, the term of this patent is extended or adjusted under 35 U.S.C. 154(b) by 108 days.

(21) Appl. No.: 17/457,724

(22) Filed: Dec. 6, 2021

(65) Prior Publication Data

US 2022/0088863 A1 Mar. 24, 2022

Related U.S. Application Data

(63) Continuation of application No. 16/949,113, filed on Oct. 14, 2020, now Pat. No. 11,285,667.

(60) Provisional application No. 62/930,920, filed on Nov. 5, 2019, provisional application No. 62/931,013, filed on Nov. 5, 2019.

(51) Int. Cl.
*B29C 64/209* (2017.01)
*B33Y 30/00* (2015.01)
*B29C 64/227* (2017.01)
*B33Y 10/00* (2015.01)

(52) U.S. Cl.
CPC .......... *B29C 64/209* (2017.08); *B29C 64/227* (2017.08); *B33Y 30/00* (2014.12); *B33Y 10/00* (2014.12)

(58) Field of Classification Search
CPC ..... B29C 64/227; B29C 64/209; B33Y 10/00; B33Y 30/00
See application file for complete search history.

(56) References Cited

U.S. PATENT DOCUMENTS

2017/0297221 A1 10/2017 Leu et al.

FOREIGN PATENT DOCUMENTS

| CN | 204 658 952 U | | 9/2015 |
| CN | 204658952 U | * | 9/2015 |
| WO | 2018/187472 A1 | | 10/2018 |

OTHER PUBLICATIONS

International Search Report and Written Opinion dated Jan. 21, 2021, from the ISA/European Patent Office, for International Application No. PCT/IB2020/059665 (filed Oct. 14, 2020), 11 pgs.

(Continued)

*Primary Examiner* — Joseph S Del Sole
*Assistant Examiner* — Jamel M Nelson
(74) *Attorney, Agent, or Firm* — Ascenda Law Group, PC

(57) ABSTRACT

Systems for material deposition. One such system includes a number of containers arranged relative to one another in a conical or other shape, pointing toward a common deposition point. When not actively depositing material, the containers are held at a distance from the deposition point. Another system has a rod disposed within a container and a flexible tip on the rod seals a material exit of the container when biased closed. Pressurized gas introduced into the container forces the rod away from the material exit and material from the container. In yet another system, a container includes a barrel adapter having a one-way air valve that seals the container and creates a vacuum, preventing material from leaking from the container. Upon application of a pressurized gas, the one-way valve is forced open and material is deposited from the container. The valve closes automatically in the absence of the gas.

6 Claims, 17 Drawing Sheets

(56) References Cited

OTHER PUBLICATIONS

International Preliminary Report on Patentability dated Oct. 4, 2021, from the IPEA/European Patent Office, for International Patent Application No. PCT/IB2020/059665 (filed Oct. 14, 2020), 11 pgs.
Notice of Allowance dated Nov. 24, 2021, from U.S. Appl. No. 16/494,113, filed Oct. 14, 2020, 10 pgs.
Amendment filed Nov. 3, 2021, from U.S. Appl. No. 16/494,113, filed Oct. 14, 2020, 5 pgs.
Restriction Requirement dated Nov. 2, 2021, from U.S. Appl. No. 16/494,113, filed Oct. 14, 2020, 6 pgs.

* cited by examiner

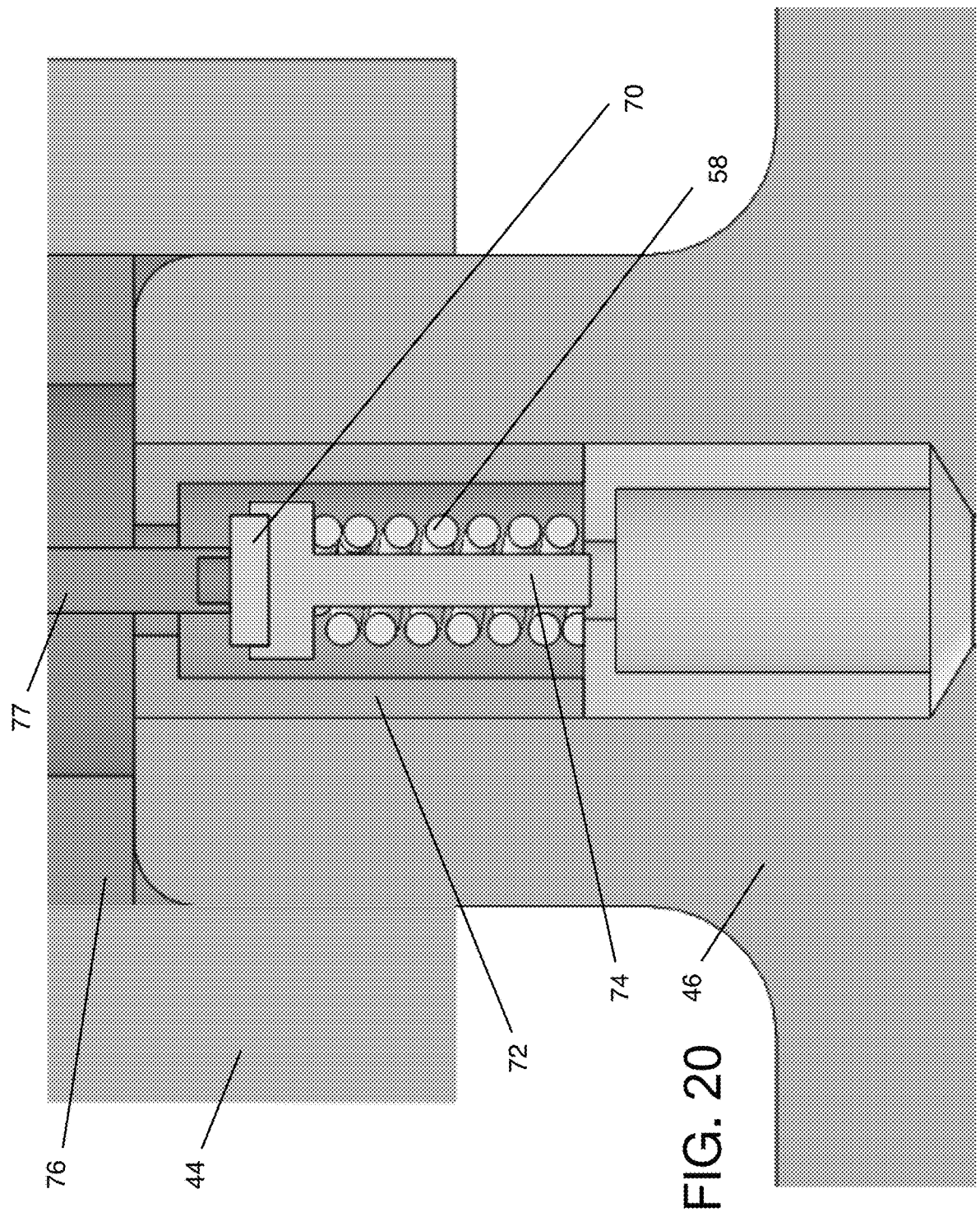

SYSTEMS FOR MATERIAL DEPOSITION

RELATED APPLICATIONS

This application is a Continuation Application of U.S. application Ser. No. 16/949,113, filed on 14 Oct. 2020 (now issued as U.S. Pat. No. 11,285,667), which is a non-provisional patent application of and claims priority to U.S. Provisional Application No. 62/930,920, filed 5 Nov. 2019, and U.S. Provisional Application No. 62/931,013, filed 5 Nov. 2019, each of which is incorporated by reference herein.

FIELD OF THE INVENTION

The present invention relates to systems for material deposition, for example, such systems as facilitate the deposition of material at a single point on a surface from several sources in rapid succession, as deposit material from a container and seal the container after deposition as part of a material printing application, and/or as seal a container holding material for deposition as part of a 3D printing application.

BACKGROUND

In the field of materials deposition, there exist several challenges related to the deposition of material from multiple sources on a single surface. For example, it is difficult to arrange containers that supply these multiple sources without using too much of the working area. Also, the deposition tips often need to be brought very close to the surface, meaning that each separate material source takes up its own footprint on the receiving surface. If only one deposition tip were used, avoiding contamination would be very difficult.

Furthermore, certain deposition techniques, such as certain methods of LIFT (laser-induced forward transfer) printing, require preparing the material to be deposited (or printed) by applying (e.g., spreading) it on a medium. Deposition of viscous material on the medium before spreading is often accomplished by use of compressed gas applied to the material container (e.g., by connecting a source of the gas to one opening in the container and forcing the material through a second opening and onto the medium). For low viscosity materials it may be necessary to hold the materials with a vacuum and effect their deposition by releasing the vacuum or pressurizing the container with compressed gas.

In such systems, the material container must sometimes be removed from the system in order to store the material, to refrigerate it, or for other reasons. Connecting and disconnecting a gas or vacuum hose from a material container in such a manner that creates an air-tight seal while still providing for rapid connection and disconnection is challenging. Removing the seal that connects the container and the gas or vacuum hose during loading and unloading of the material container causes low-viscosity materials to leak uncontrollably out of the second opening of the container. It also exposes the contents of the container to contamination from the outside.

SUMMARY OF THE INVENTION

In various embodiments, the present invention provides systems for material deposition, for example, such systems as facilitate the deposition of material at a single point on a surface from several sources in rapid succession, as deposit material from a container and seal the container after deposition as part of a material printing application, and/or as seal a container holding material for deposition as part of a 3D printing application.

In one embodiment of the invention containers, such as syringes, containing material are arranged in a conical shape or other shape with all their tips pointing toward a single point of deposition. A piston mounted on a rotating arm is moved by a motor to the desired container. The piston presses down on the container holder. The holder slides toward the point of deposition, bringing the tip of the container into proximity with the point of deposition. Pressurized gas or another method is used to force material through the container. After deposition, the piston is released, and a spring returns the container holder to its original position. The entire container array is mounted on a horizontal stage allowing movement in one direction or along an axis.

In another embodiment of the invention, a system includes a plurality of containers (e.g., syringes) configured in an array to dispense material. Each of the containers has a material dispensing end and the containers are organized within the system so that each dispensing end of each container is oriented towards a common, single deposition point. The system further includes a piston mounted on a rotating arm. The arm is rotatable to align the piston with respective mounts of each of the containers. The mounts of the containers are each translatable (e.g., along respective pairs of sliders), under actuation by said piston, to a deposition position at which the containers dispense material (e.g., under the influence of a pressurized gas) and are translatable under influence of a biasing mechanism (e.g., a spring) to return to an original position at which the containers do not dispense material. The array of containers is mounted on a stage translatable along an axis.

In operation, material may be deposited from respective ones of the plurality of containers towards the common, single deposition point by rotating the piston to be aligned with the mount of the respective container, actuating the piston against the mount of the respective container so as to translate the respective container (e.g., along its respective pair of sliders) to a deposition position, dispensing the material from the respective container using a pressurized gas, and translating the respective container to an original position by the biasing mechanism. Prior to depositing the material, the array of containers may be translated towards the deposition point by moving a stage on which the array of containers is mounted along an axis.

In some embodiments, the containers are arranged with respect to one another in a cone shape, with their material dispensing ends each oriented towards the common, single deposition point. The sliders along with the mounts of the containers are translatable help to prevent axial rotation of the containers.

The rotatable arm may have a slot therein and the system may further include a limit switch. In such cases, the slot in the arm is preferably located such that when the piston is in a home position, the slot passes through the limit switch. This helps in overall aligning of the system.

Further, each of the containers may be received in a respective one of a plurality of holders sized to accommodate containers of different sizes.

In still further embodiments of the invention, a rod is inserted in a material container (e.g., a syringe). One end of the rod is fitted with a flexible tip which seals the hole from which the material is deposited. The rod and tip are forced against the hole with a pre-loaded spring or other device mounted on the opposite side of the container. A cylinder is attached to the opposite end of the rod. This cylinder sits inside a cylindrical tube connected to a pressurized gas supply, creating a pneumatic piston. The pressurized gas is used to force the piston rod away from the material exit. Simultaneously, a gap between the rod and its housing allows the gas to flow into the chamber where the material is held. The opening of the exit and the application of pressurized gas forces material from the container, effecting deposition. In some cases, a vacuum is applied via the pressurized gas port, e.g., sequentially after the pressurized gas, serving to return the piston and seal the exit. The vacuum can also be used to perform de-gassing on the material in the syringe.

In yet a further embodiment of the invention, a one-way air valve is inserted in a syringe barrel adapter. When the adapter is connected to the syringe (the material container in this embodiment of the invention), it seals the syringe completely. This creates a vacuum in the syringe, which prevents the material from dripping out of the deposition tip uncontrollably. An air hose screws onto the barrel adaptor. Inside a threaded head is a small bar which presses on the one-way valve, forcing it open. On either side of the bar are holes to allow air to pass through. The air hose is easily disconnected from the top of the syringe barrel adaptor. As it is unscrewed, it ceases to press on the one-way valve, and the valve closes automatically. In this fashion syringes can easily, quickly, and cheaply be replaced to facilitate deposition of multiple materials in rapid succession.

In still another embodiment of this invention, a flexible rubber valve replaces the one-way valve. As the gas hose is screwed onto the barrel adaptor, the valve is forced open, pressurizing the syringe. When the hose is disconnected, the valve closes automatically, sealing the syringe.

In another embodiment of this invention, the one-way valve is replaced by a metal ball on a spring. When the syringe is disconnected from the hose, the spring forces the ball against a rubber gasket, sealing the syringe. When the syringe is connected to the gas hose, a small pin forces the ball down, opening the valve and facilitating pressurization of the syringe.

In a further embodiment of this invention the one-way valve is replaced by a rubber disc on a spring. When the gas hose is disconnected from the syringe, a spring forces the rubber disc against a small aperture, sealing it shut. When the hose is attached to the syringe, a pin presses the disc downward opening the valve.

These and further embodiments of the invention are described below.

BRIEF DESCRIPTION OF THE DRAWINGS

The present invention is illustrated by way of example, and not limitation, in the figures of the accompanying drawings, in which:

FIG. 20 shows a cross-section of an alternative configuration to the system shown in FIG. 10, showing a disc valve in open position.

DETAILED DESCRIPTION

Described herein are systems for material deposition, for example, such systems as facilitate the deposition of material at a single point on a surface from several sources in rapid succession, as deposit material from a container and seal the container after deposition as part of a material printing application, and/or as seal a container holding material for deposition as part of a 3D printing application.

In a first example, a system that facilitates the deposition of material at a single point on a surface from several sources in rapid succession is described. In one embodiment, containers, such as syringes, containing material are arranged in a conical shape or other shape with all their tips pointing toward a single point of deposition. A piston mounted on a rotating arm is moved by a motor to the desired container. The piston presses down on the container holder. The holder slides toward the point of deposition, bringing the tip of the container into proximity with the point of deposition. Pressurized gas or other means is used to force material through the container. After deposition, the piston is released, and a spring returns the container holder to its original position. The entire container array is mounted on a horizontal stage allowing movement in one direction or along an axis.

Alternatively, rather than having to first select a desired container to dispense material, rotate the piston to the selected container, and then move the container and piston arrangement so that the tip of the container is proximate the point of deposition, each container may be fitted with a piston-like arrangement so that a respective container need only be moved to the deposition position and its respective piston (or other dispensing actuator) engaged in order to deposit material. Such an arrangement may provide for more rapid dispensing of material than one which requires rotation of the piston.

Figure 1:
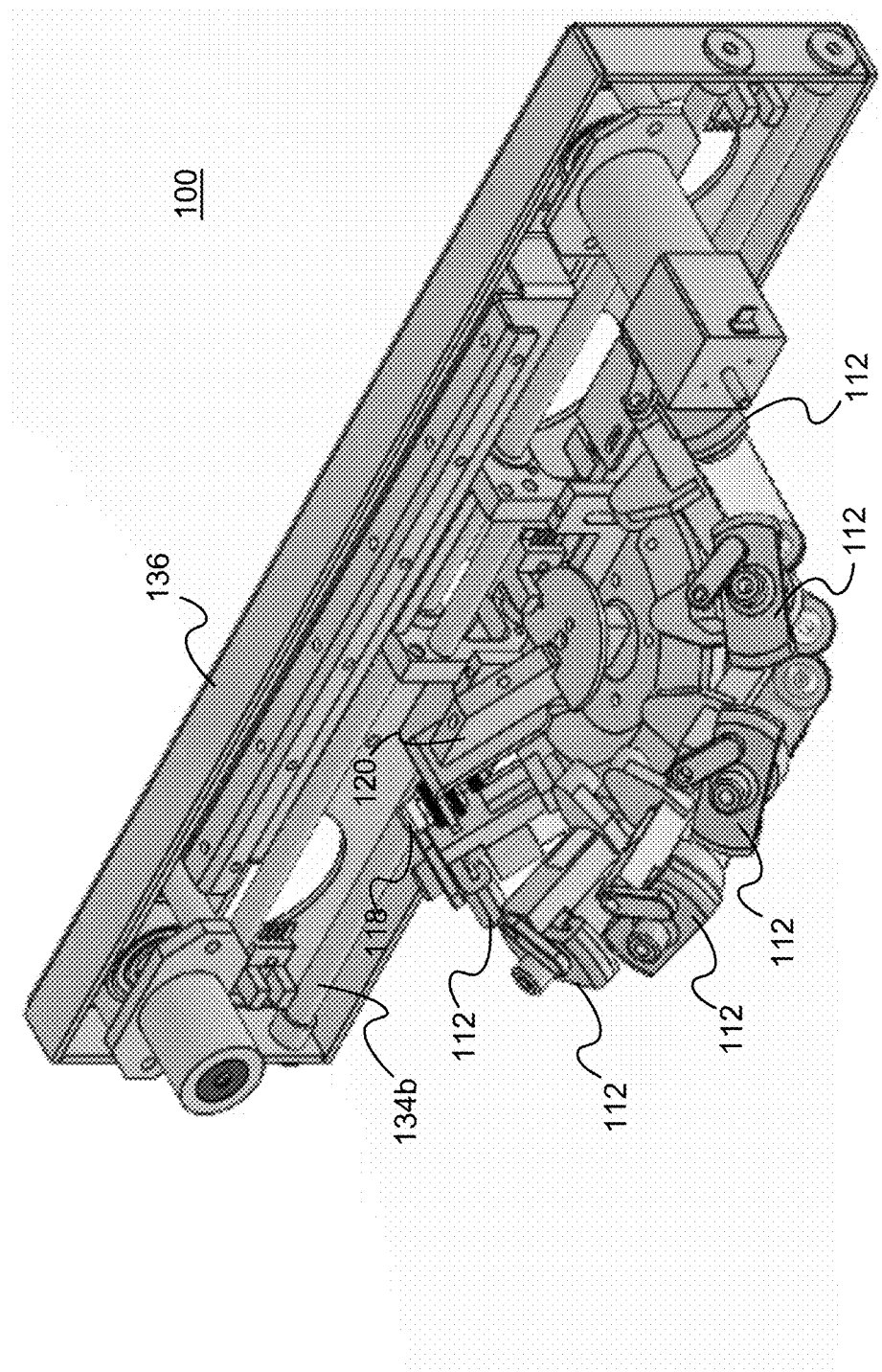
FIG. 1 illustrates an overview of a system that facilitates the deposition of material at a single point on a surface from several sources in rapid succession, according to one embodiment of the present invention.
Figure 2:
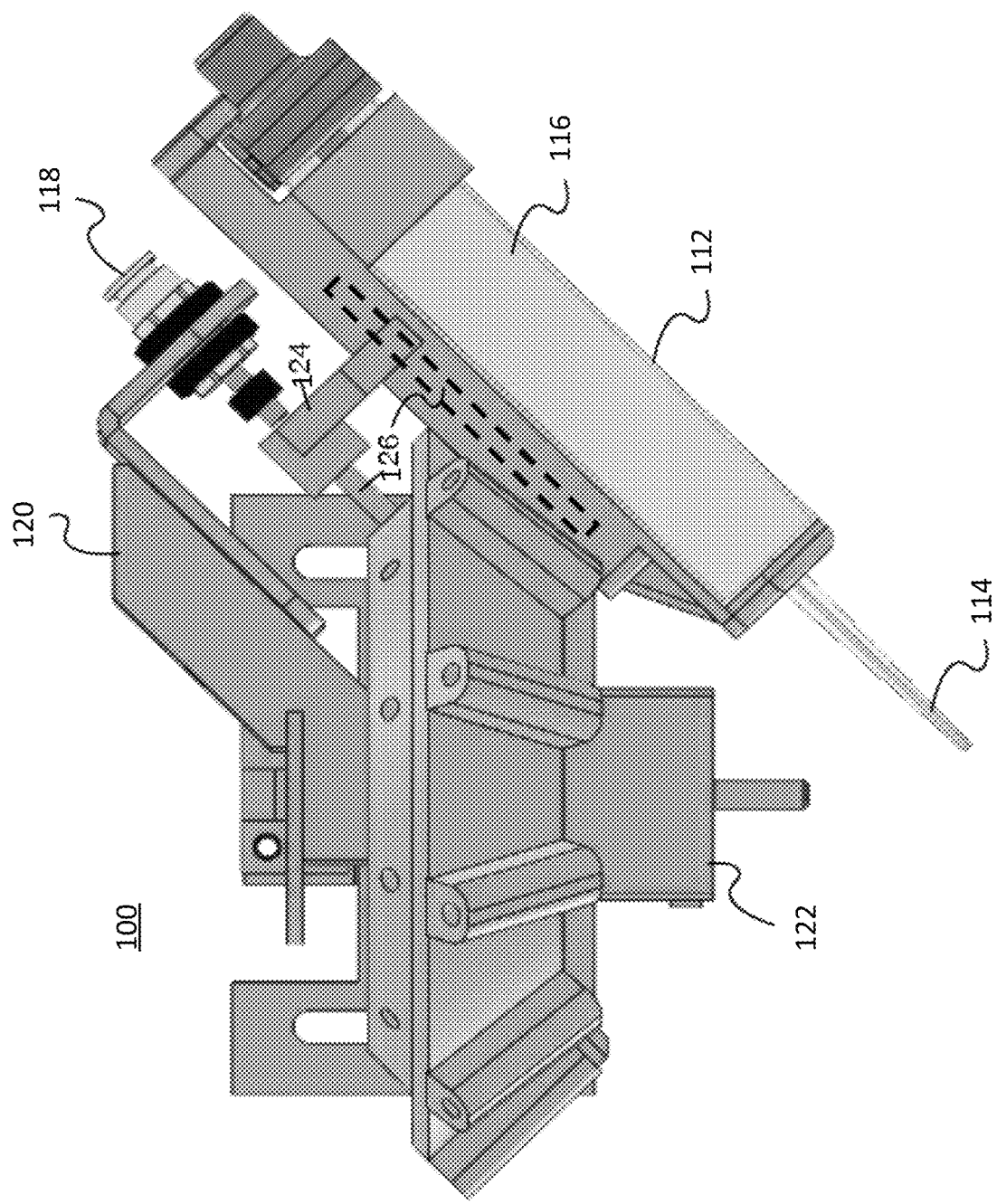
FIG. 2 illustrates a detailed view of one syringe of a system such as that illustrated in FIG. 1.
Figure 3:
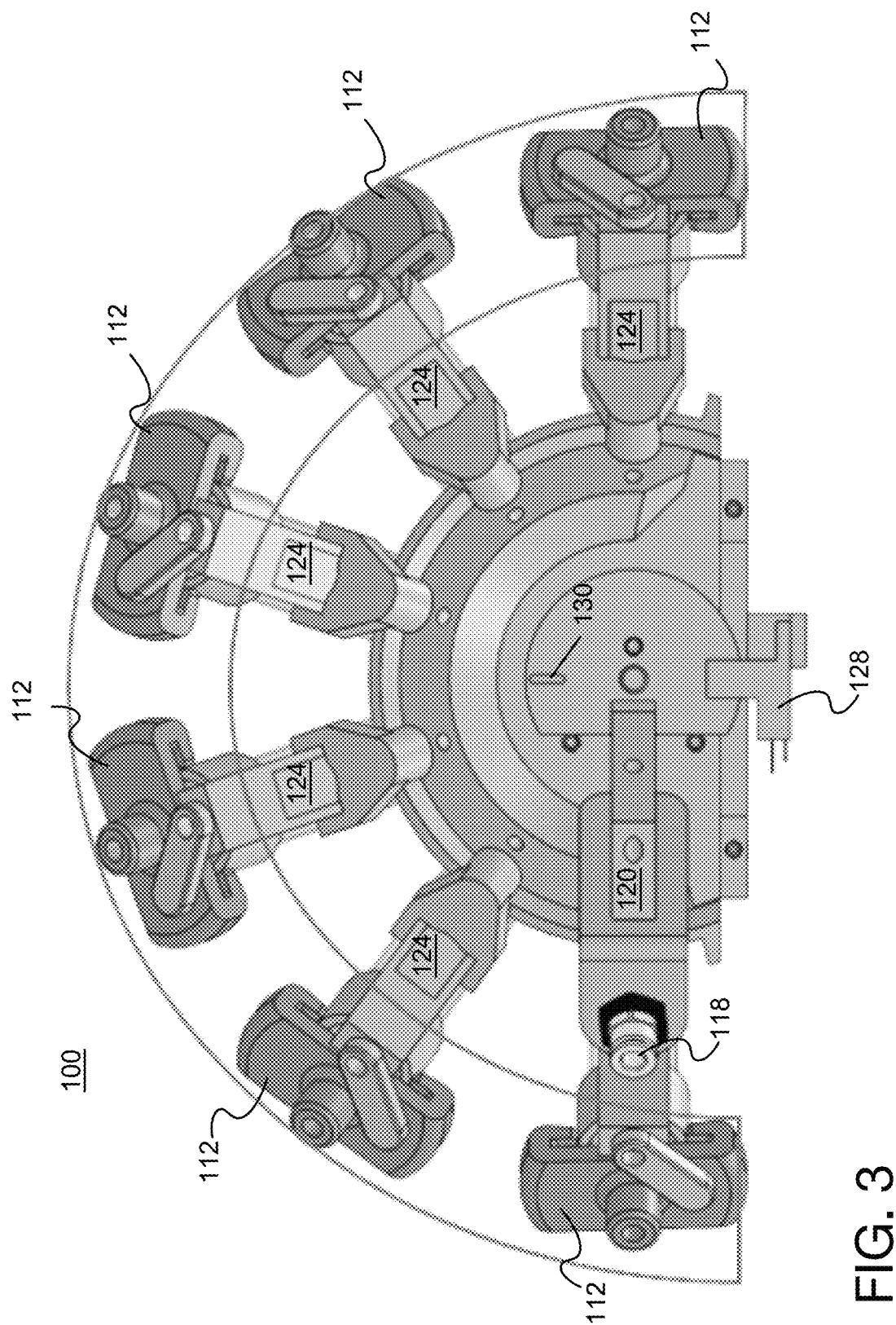
FIG. 3 illustrates a top view of a plurality of syringes and a rotating arm for a system such as that illustrated in FIG. 1.

Referring to FIGS. 1-3, a system 100 that facilitates the deposition of material in accordance with embodiments of the invention is illustrated. In one embodiment syringes 112 containing material are arranged in a cone shape, with their tips 114 pointing at one common point in space. Alternatively, the syringes or other containers 112 can be arranged with part of their barrels 116 in a closed loop of any shape with their tips 114 pointing at a common single point in space. Springs or other biasing mechanisms keep the syringes or other containers 112 lifted a fixed distance above the deposition surface (not shown).

In the illustrated embodiment, to deposit material from a given syringe or other container 112 the container is first brought into proximity with the deposition surface (wherein lies the point toward which all the tips of the containers point). A piston 118 is mounted on a rotating arm 120. A motor 122 rotates arm 120 so that the piston 118 is brought in line with the desired container 112. The piston 118 is actuated so that it presses down on the container mount 124. In another embodiment of the invention, each container has its own piston and there is no rotating arm.

The container 112 slides along two sliders 126, which ensure that the container does not rotate about its axis. The piston 118 then brings the deposition tip 114 into proximity with the deposition surface. A pressurized gas or other means is then used to force material from the container 112 onto the deposition surface. In this way the system can deposit material from many (six in this illustrated example, but more or fewer in other embodiments) containers in rapid succession, because all of the containers (e.g., their point of dispensing) are close to their final location, and all that is needed is to rotate the piston into position and to actuate it, which is accomplished quickly with currently conventional pistons and motors.

The system is equipped with a limit switch 128 to perform homing. The rotating arm 120 has a slot 130 cut into it. The slot 130 is located such that when the piston 118 is in its home position, the slot 130 passes through the limit switch 128. In this way the arm 120 can be rotated to a precise home position.

The system is designed such that it can operate without all the containers being loaded onto the system. By using holders of different sizes, the system 100 can accommodate containers 112 of different sizes (e.g., at the same time), although this may require by leaving some container spots empty.

As mentioned above, an alternative arrangement eliminates the need to rotate arm 120 so that the piston 118 is brought in line with the desired container 112. Instead, each container 112 is fitted with its own dispensing mechanism (e.g., a piston like piston 118) so that when the container is brought into proximity with the deposition surface its respective dispensing mechanism can be immediately activated to dispense material. Or, the dispensing mechanism (e.g., a piston or other device) may be centrally located and bringing the container into proximity with the deposition surface would include positioning the container so that it is acted upon by the centrally located dispensing mechanism. Thus, the plurality of containers 112 may each include a respective piston 118 or other dispensing mechanism and may be arranged about the common point of deposition with their respective material dispensing ends 114 oriented towards that common point of deposition. Each container may be included within a respective mount 124 and translatable so as to actuatable by its respective piston or, alternatively by another dispensing mechanism, when in a deposition position at which each respective container dispenses material, and further translatable under influence of a biasing mechanism to return to an original position at which each respective container does not dispense material.

Figure 4:
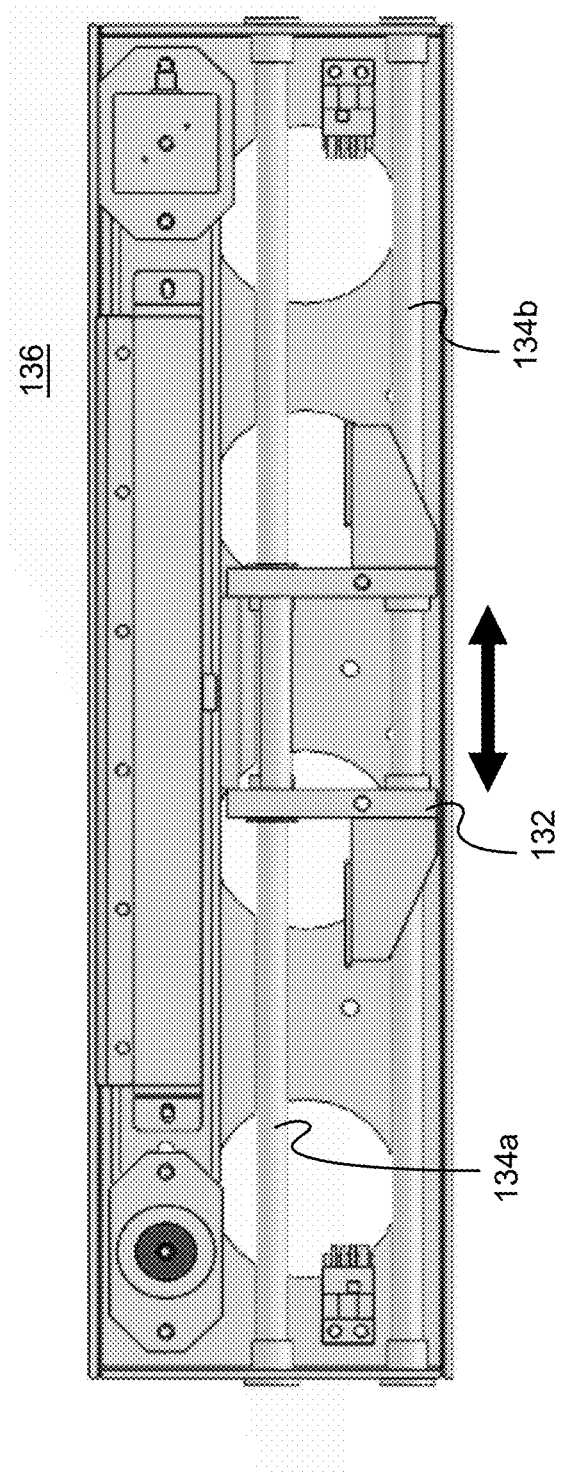
FIG. 4 illustrates a horizontal stage for a system such as that illustrated in FIG. 1.
Figure 6:
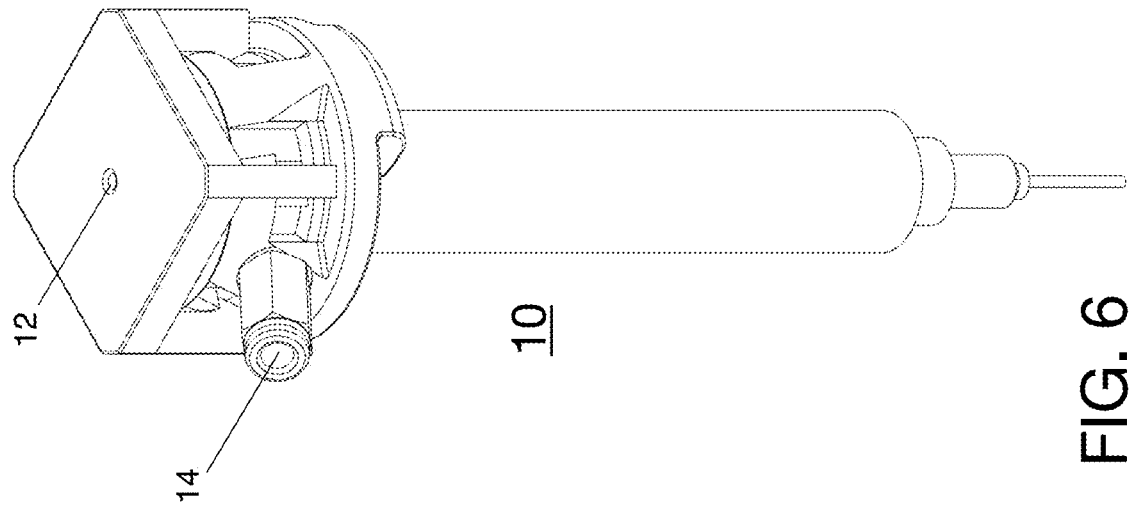
FIG. 6 is an external isometric view of the system shown in FIG. 5.
Figure 5:
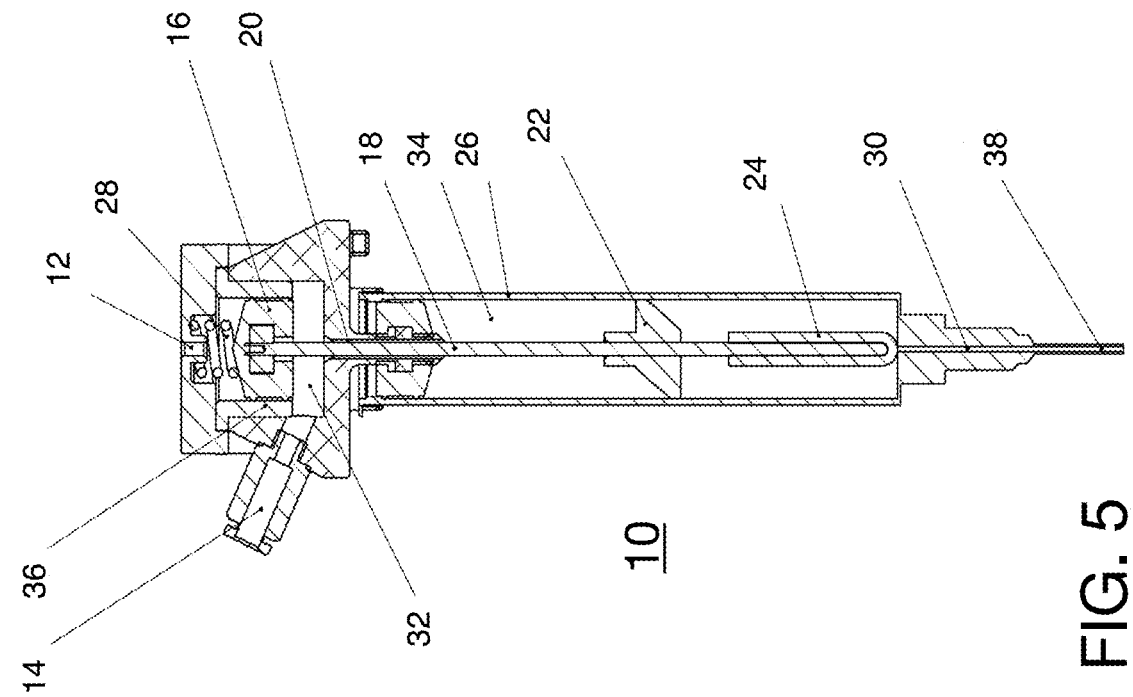
FIG. 5 is a section view of system that deposits material from a container and seals the container after deposition as part of a material printing application in closed position, in accordance with an embodiment of the present invention.
Figure 8:
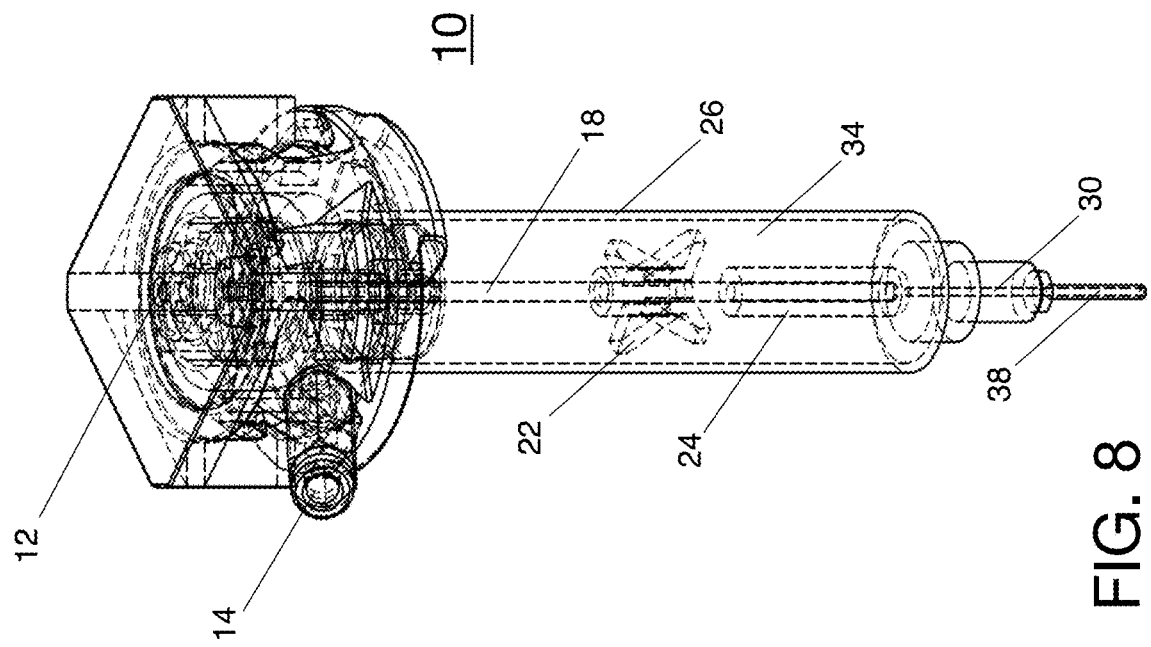
FIG. 8 is a hidden line view of the system shown in FIG. 5, showing how pressurized gas can pass by the guide.
Figure 7:
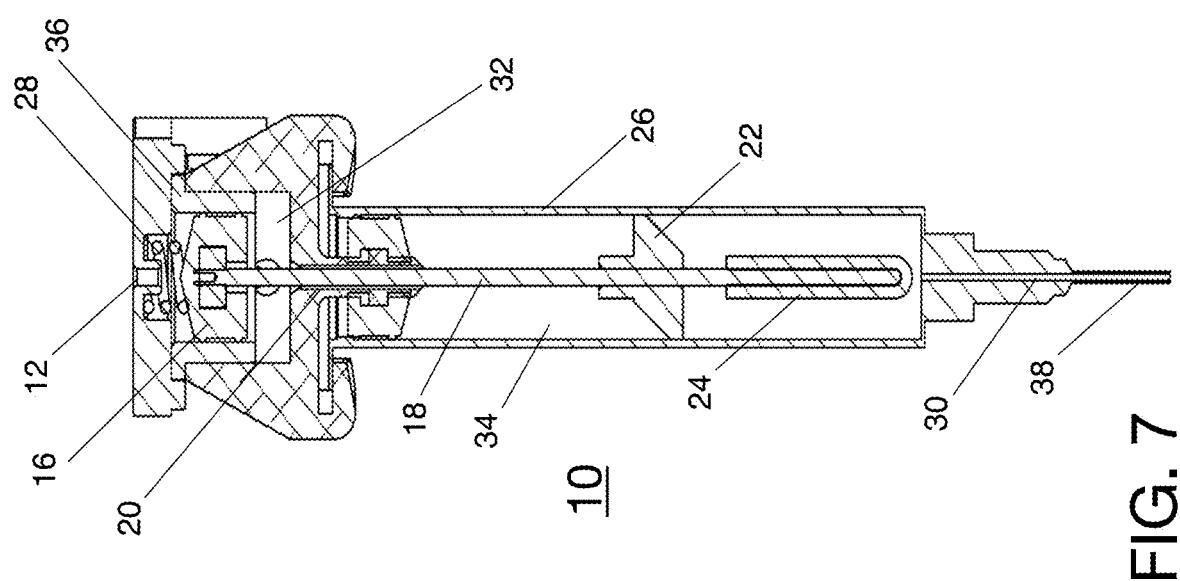
FIG. 7 is a section view of the system shown in FIG. 5 in open position.
Figure 9:
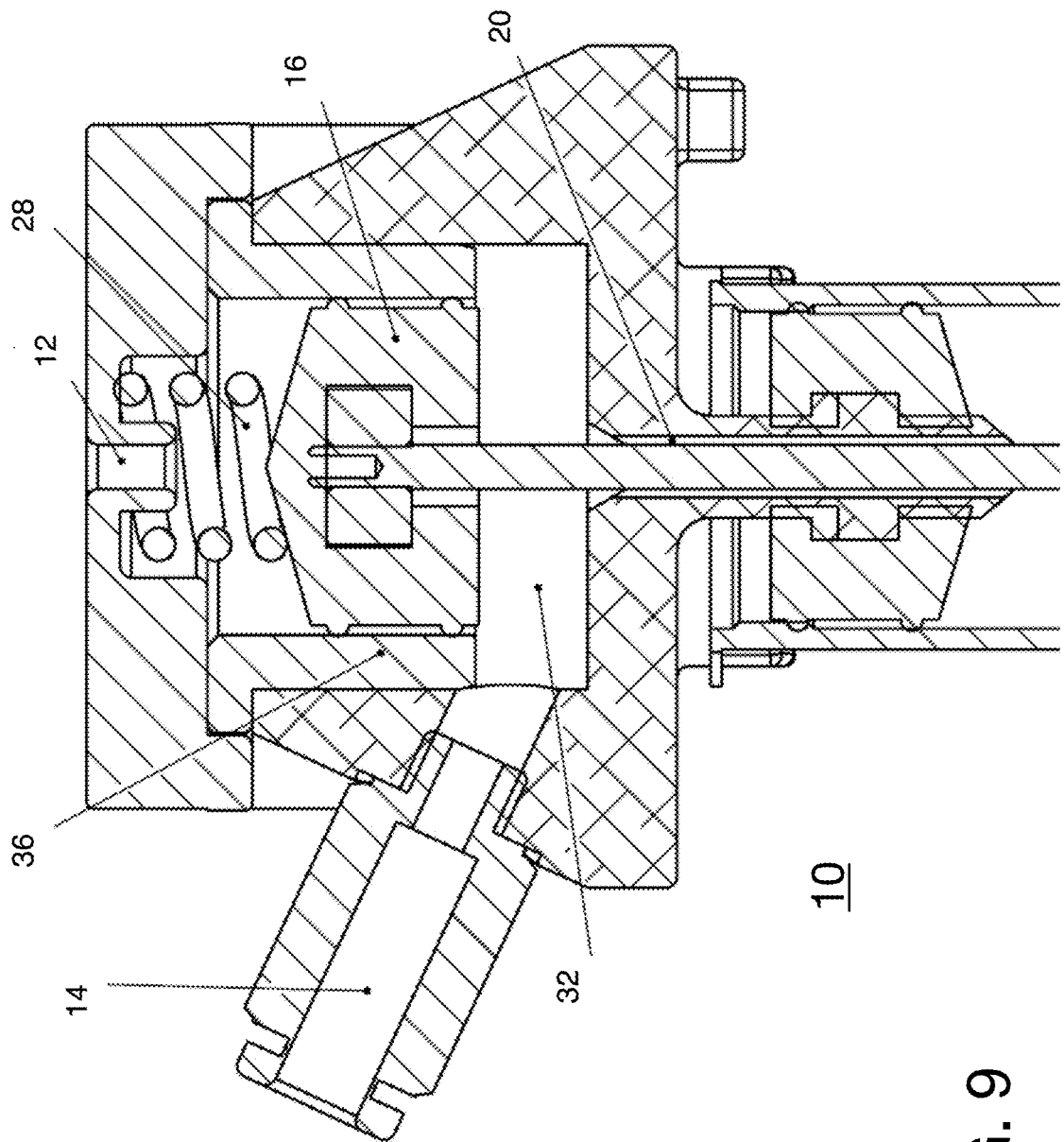
FIG. 9 provides an enlarged view of syringe cap for the system shown in FIG. 5, showing grooves to allow pressurized gas to pass to the syringe body.
Figure 11:
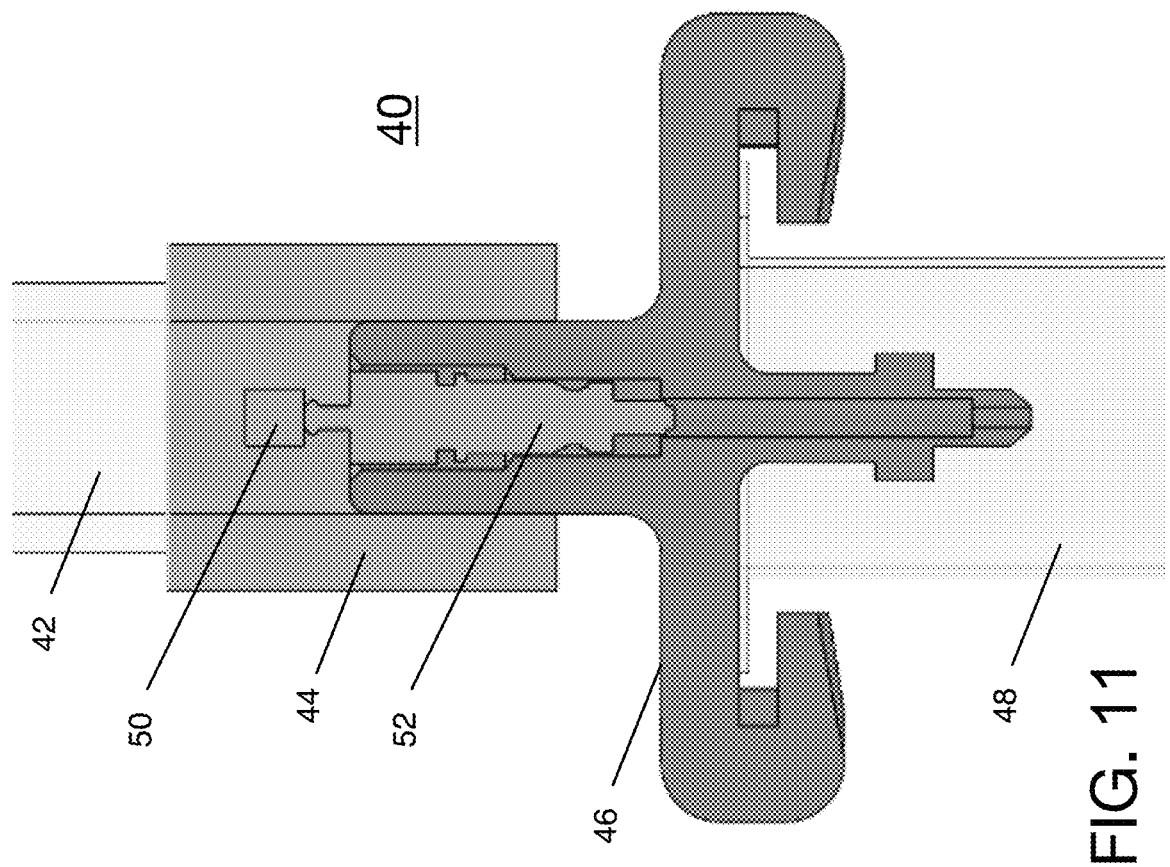
FIG. 11 provides an enlarged view of the system shown in FIG. 10, showing a one-way valve mounted inside the syringe barrel adapter, the valve being forced open by a bar in the threaded connector.
Figure 10:
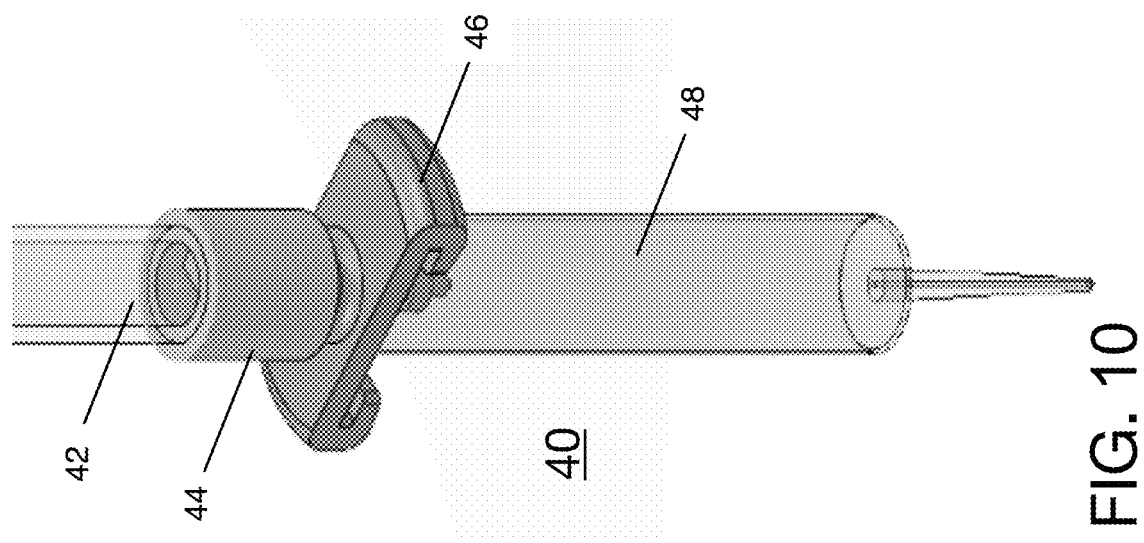
FIG. 10 illustrates an example of a system that seals a container holding material for deposition as part of a 3D printing application in accordance with an embodiment of the present invention, showing a pressurized air hose, threaded connector, syringe barrel adapter, and syringe.
Figure 12:
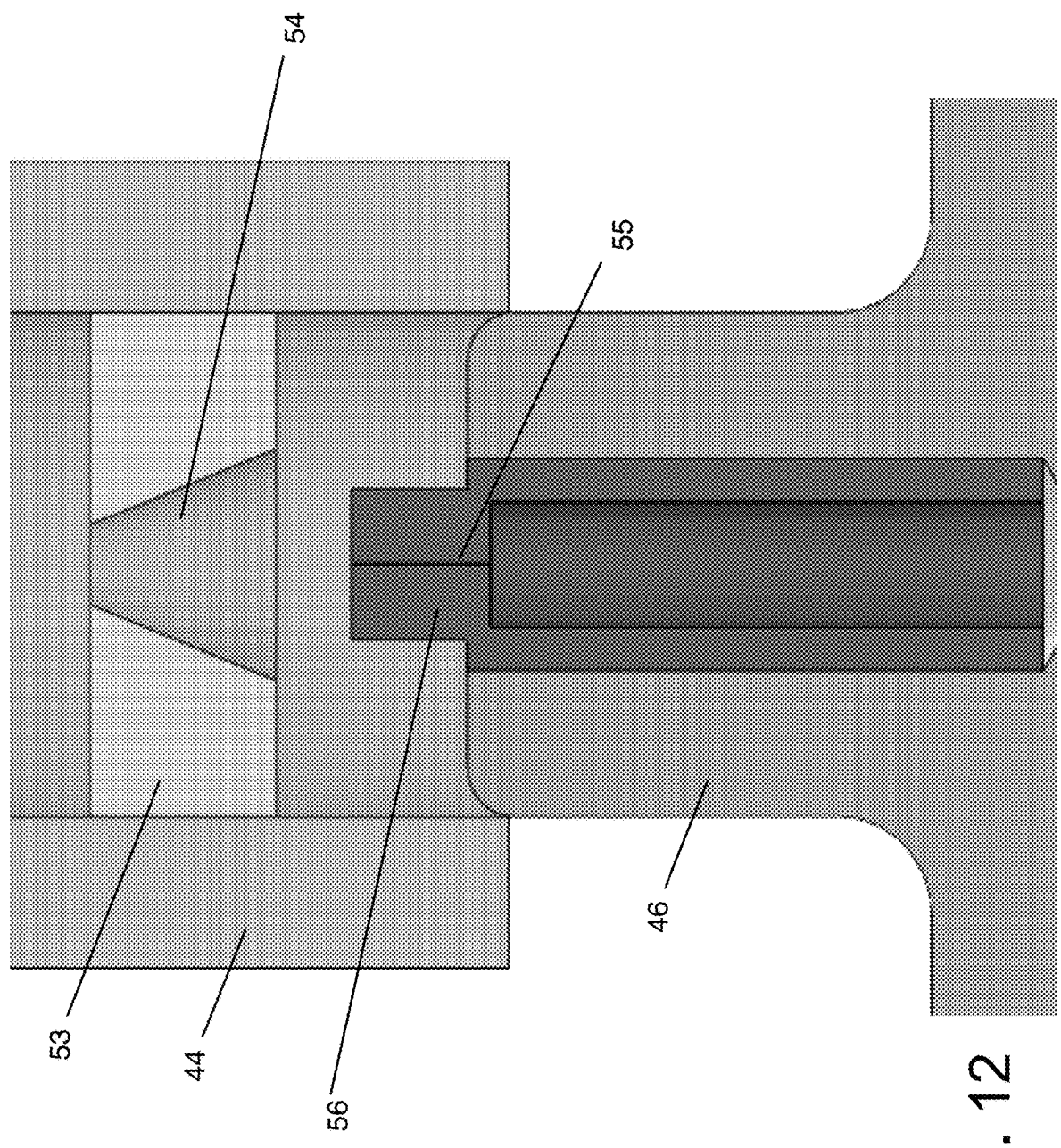
FIG. 12 is a cross-section view of the system shown in FIG. 10, showing an alternative configuration with a flexible rubber valve, shown in the closed position, that seals the syringe.
Figure 13:
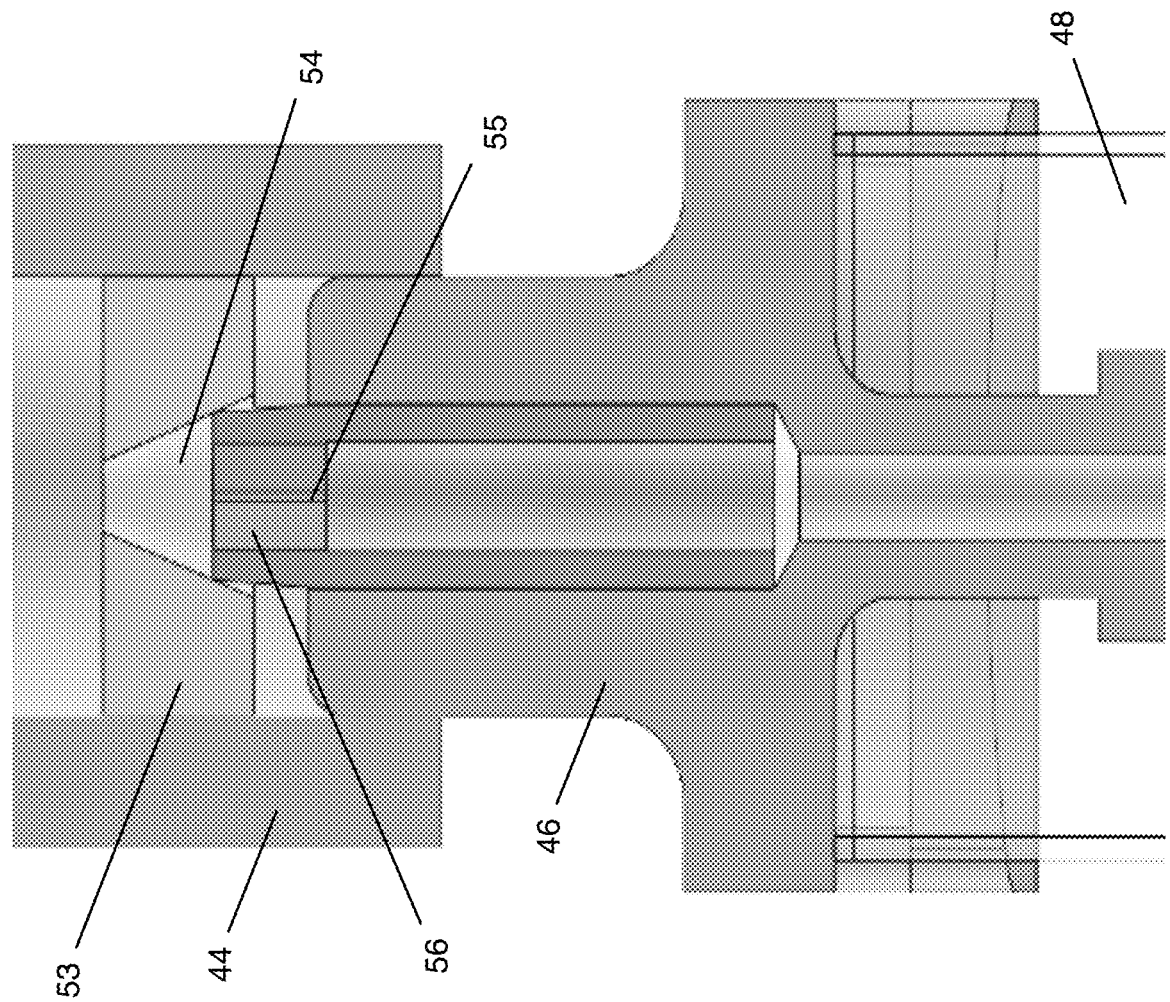
FIG. 13 shows a cross-section of the system taken at 90° to that illustrated in FIG. 12, showing the valve being forced open.
Figure 14:
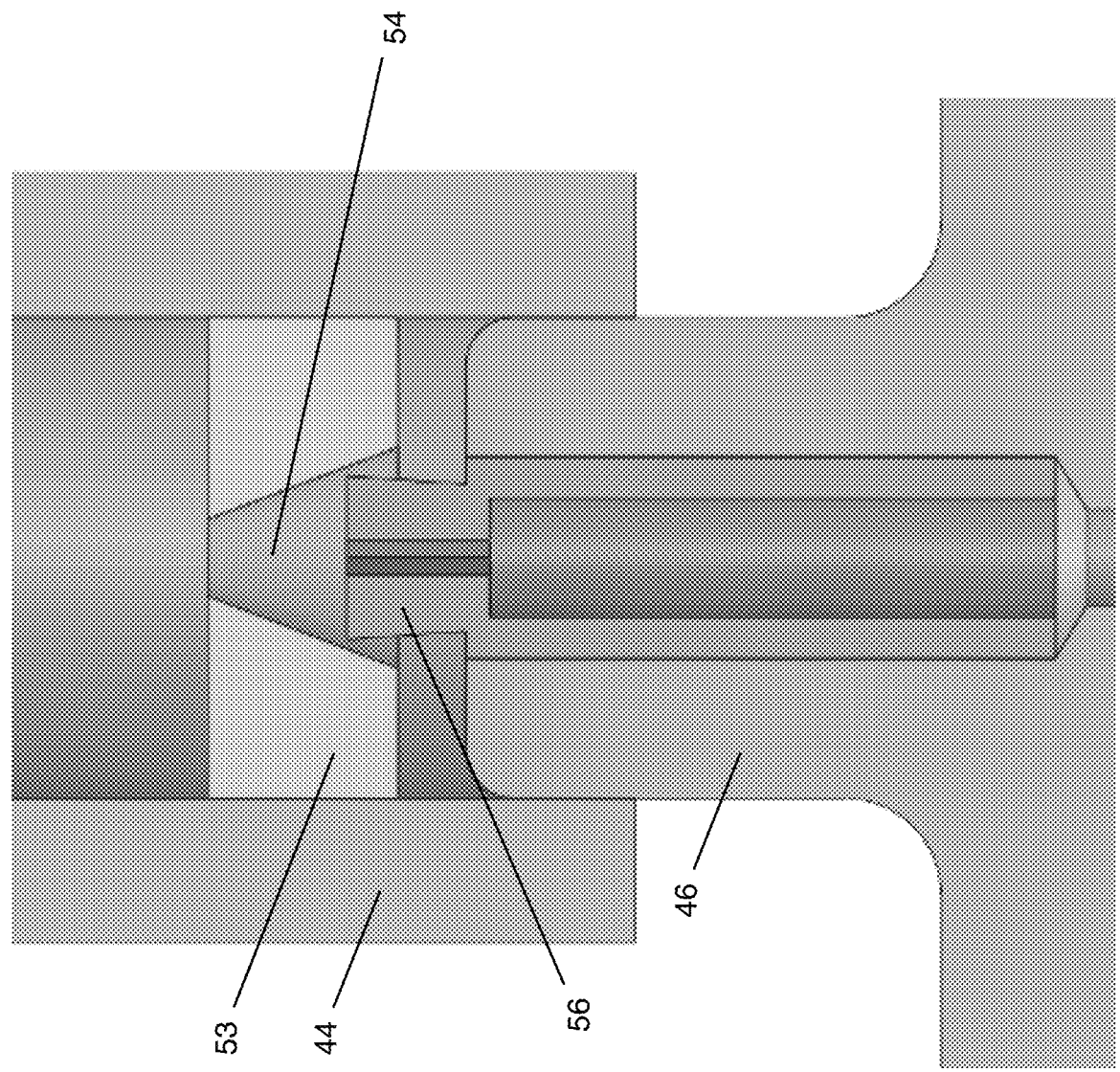
FIG. 14 shows a cross-section of the system taken at 90° to that illustrated in FIG. 13.
Figure 15B:
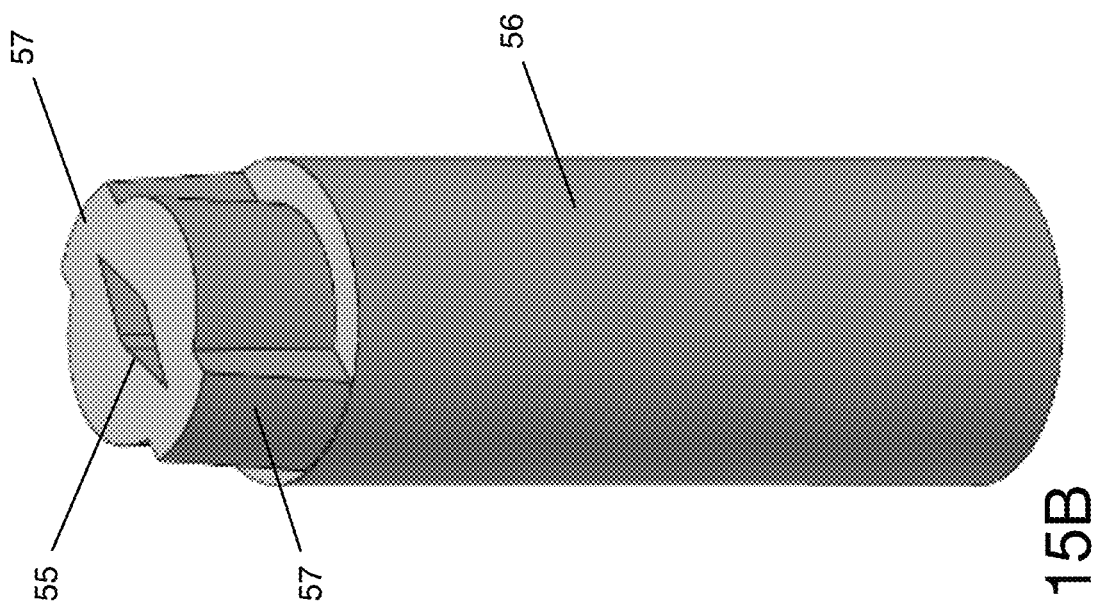
FIGS. 15A and 15B show isometric views of a rubber valve of the system shown in FIG. 10, in closed and open positions, respectively.
Figure 15A:
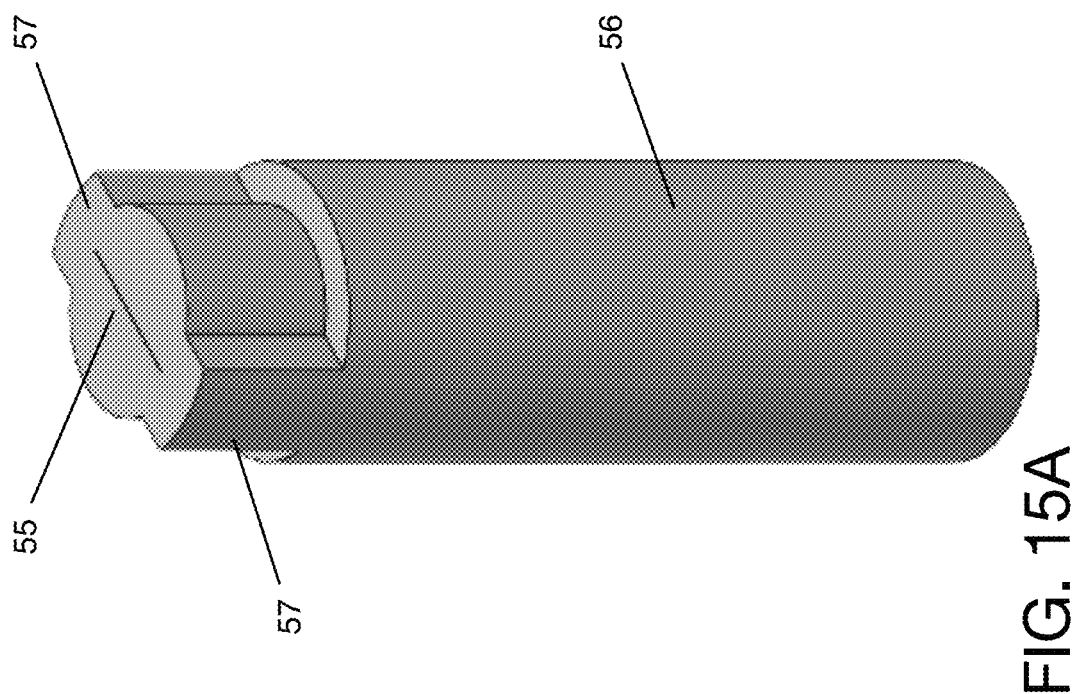
Figure 16:
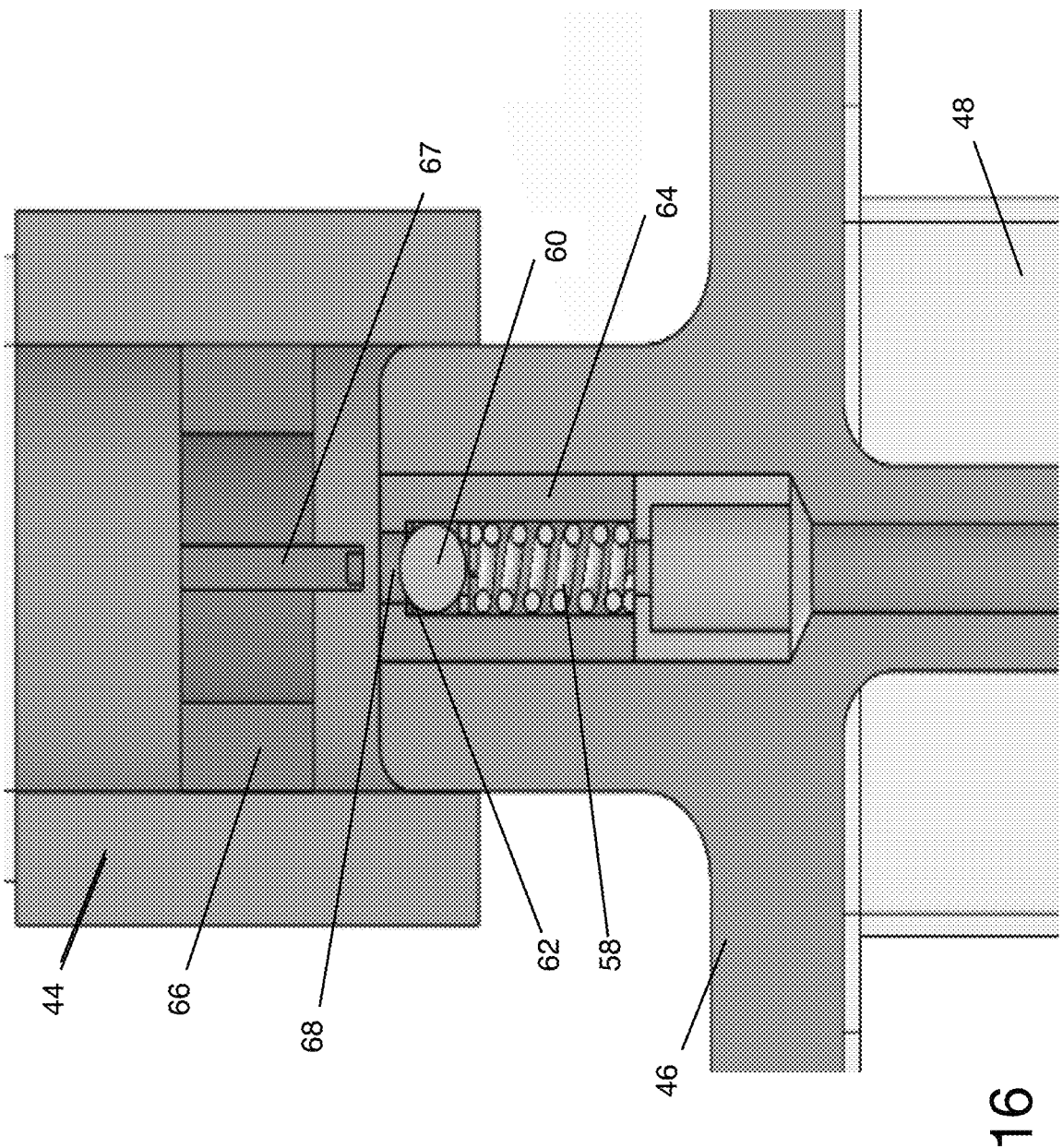
FIG. 16 shows a cross-section of an alternative configuration to the system shown in FIG. 10, showing a ball-and-spring valve in closed position.
Figure 17:
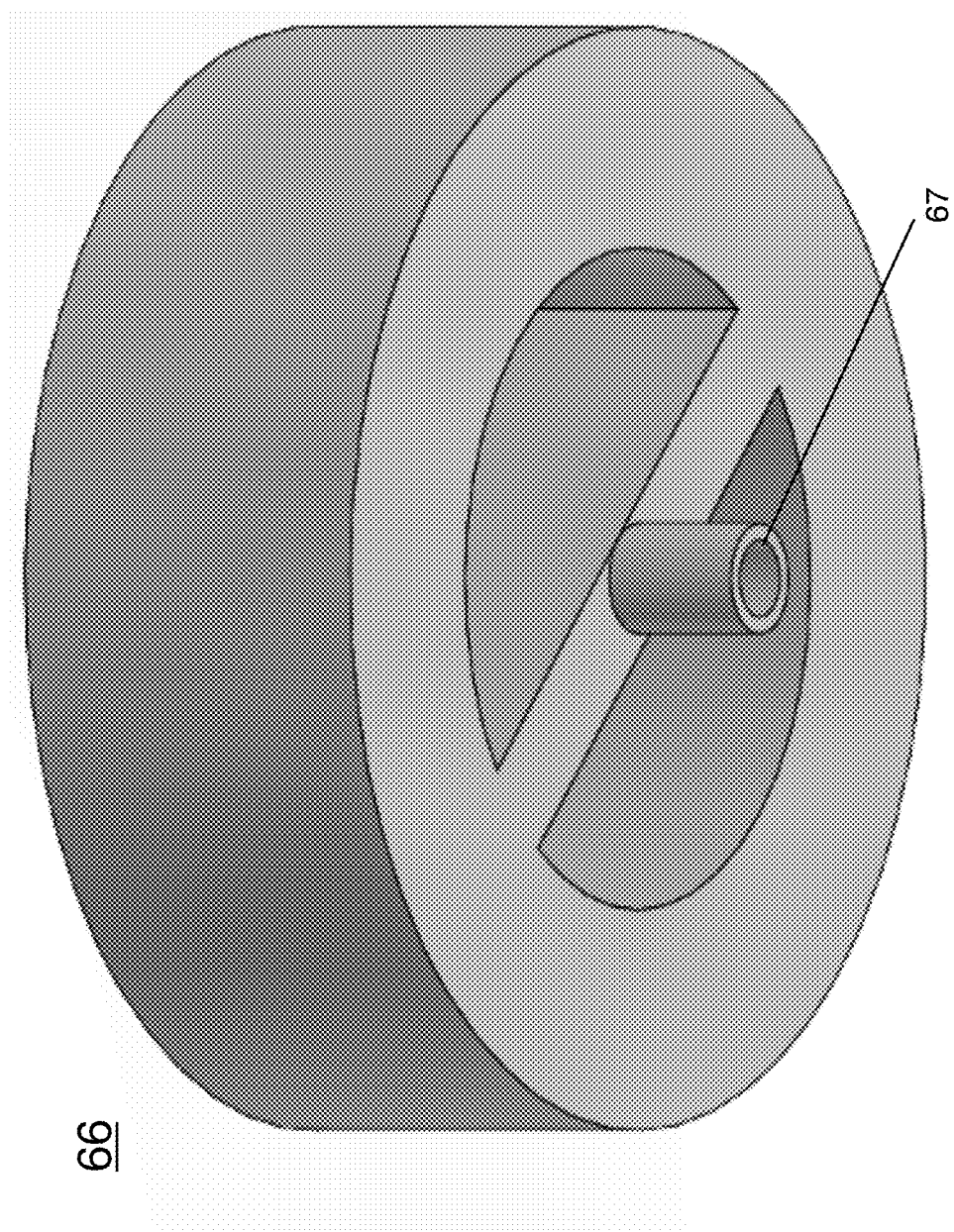
FIG. 17 shows an isometric view of the metal sleeve and pin that are depicted in FIG. 16.
Figure 18:
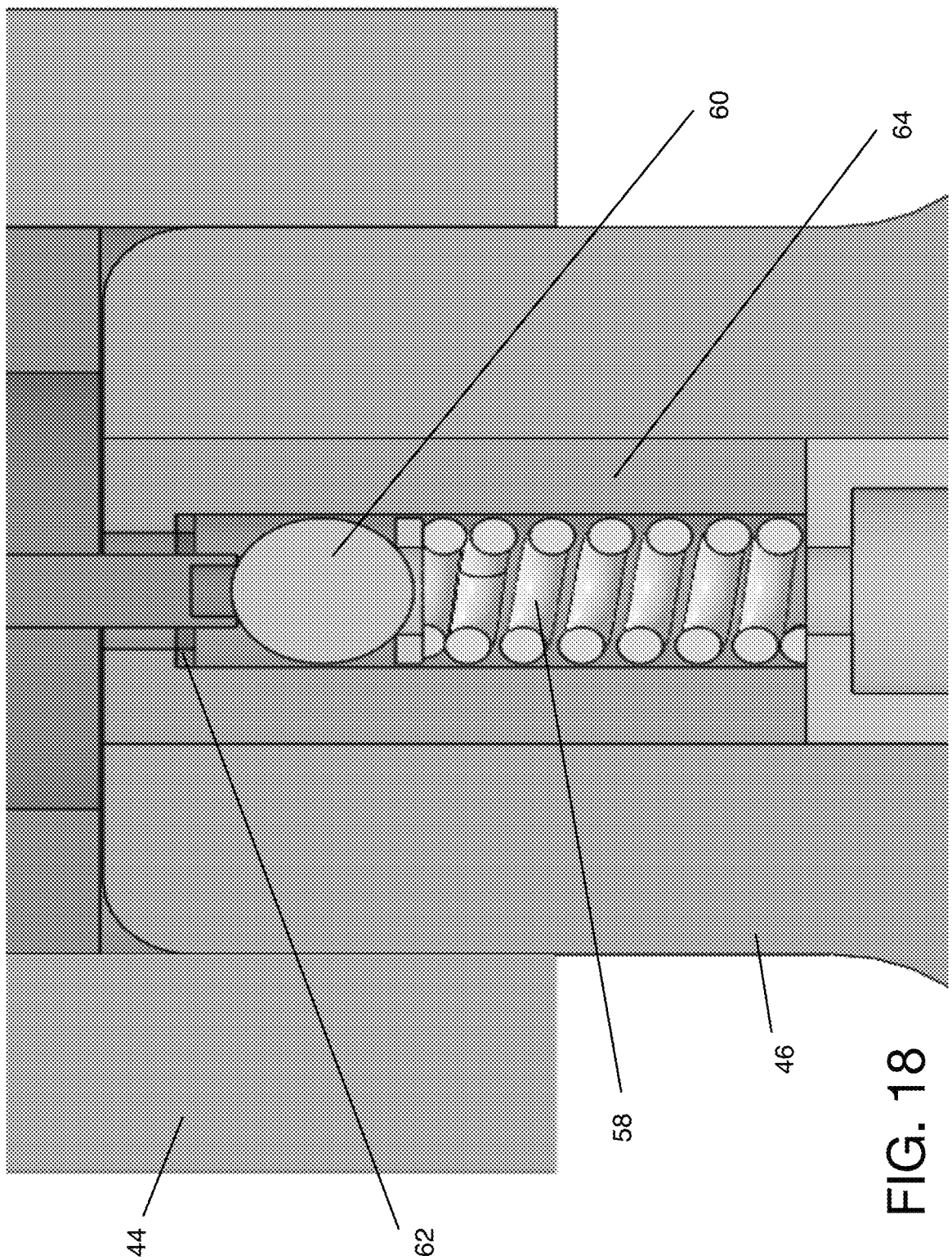
FIG. 18 shows a cross-section of an alternative configuration to the system shown in FIG. 10, showing a ball-and-spring valve in open position.
Figure 19:
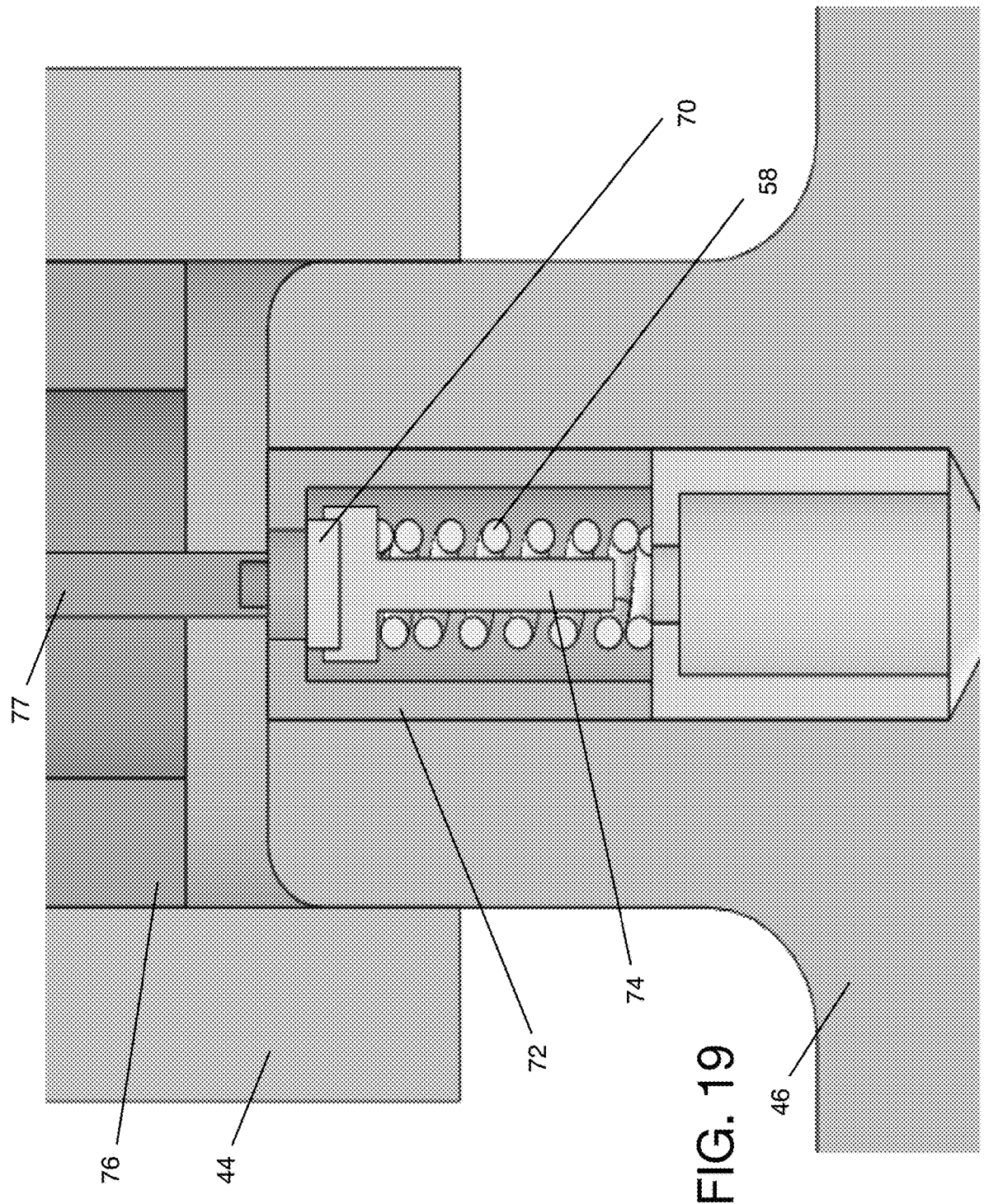
FIG. 19 shows a cross-section of an alternative configuration to the system shown in FIG. 10, showing a disc valve in closed position.

Referring to FIG. 4, the array of containers 112 may be mounted on a horizontal stage 132, which is translatable (under the control of a motor) along two rails 134a, 134b on a frame 136. This allows control over where the material is deposited in one dimension and can facilitate, for example, optimal spreading of material on a deposition surface. This horizontal stage 132 also gives the system the ability to remove the containers 112 from the deposition area. This facilitates maintenance tasks, cleaning containers, replacing containers, or other tasks. It also gives the system the ability to remove the containers from the working area to avoid contamination.

Thus, a system to deposit material from many containers (e.g., syringes) in rapid succession by orienting the openings of the containers toward a single point of deposition and rapidly moving the containers towards that point before deposition has been described. In some embodiments, close packing of the containers in a cone or other shape with their deposition ends pointing towards the common (single) point of deposition minimizes the footprint of the system and minimizes time between deposition from each container. The containers are arranged so as to each move in the vertical direction (or, more generally, along a linear axis) on two sliders which prevents axial rotation of the containers. In further embodiments of the invention, a system to move many containers of material for deposition along a single axis to control the point of deposition is provided. The present invention affords the ability to use containers of various sizes by using appropriately sized holders which can be removed and replaced and leaving some container slots empty, as necessary. A limit switch and slot cut into part of the rotating arm enables the arm to accurately return to its home position.

Now turning to further examples of systems for material deposition, a system that deposits material from a container and seals the container after deposition as part of a material printing application is described. Referring to FIGS. 5-9, a system 10 and method for sealing a syringe (or other container) containing material for deposition, e.g., in a 2D or 3D printing application are illustrated. A rod 18 is inserted inside the syringe 26. A flexible cap 24 is attached to one end of the rod. This cap creates a seal with the material exit 30. When the rod 18 is forced in the direction of the exit 30, an airtight seal is formed, and no material can leak out of the exit. A guide 22 can be attached to the rod 18, ensuring that the rod 18 is properly aligned with the exit 30.

A gasket/O-ring 16 is attached to the other end of the rod 18. The gasket/O-ring 16 is mounted inside a cylindrical tube 36, forming a piston. The piston is actuated using pressurized gas. Vacuum can be used to aid operation of the piston. Gas enters via a connection 14 mounted in the syringe cap. The gas enters a channel 32 under the piston, forcing it away from the exit 30, and opening the exit. Grooves 20 in the syringe cap allow gas to enter the body of the syringe 34 where the material is held. The pressurized gas in the body of the syringe forces material through the exit 30. A relief hole 12 allows air to exit and enter freely according to the position of the piston. A vacuum can also be applied sequentially after the pressurized gas via the same port. The vacuum aids the spring 28 in returning the piston and sealing the exit 30. The vacuum can also be used to perform de-gassing on the material in the syringe.

When material is not being deposited, spring 28 forces the piston down, creating an airtight seal at the exit 30. This seal is maintained even if the syringe is disconnected from the gas/vacuum line. This allows removal of the syringe from this system without material leaking from the exit.

By controlling the strength and timing of the application of pressurized gas and vacuum, as well as the inner diameter of the needle 38, the deposition of material can be controlled.

Still a further example of a system for material deposition, in particular a system that seals a container holding material for deposition as part of a 3D printing application, is discussed with reference to FIGS. 10-20. In this example, a system 40 includes a syringe barrel adapter 46 fitted onto a syringe 48 containing the material to be deposited. A one-way air valve 52 is mounted inside the adapter 46. A gas hose 42 is attached to the end of the adapter 46 via a threaded connector 44 and is connected to a tank of pressurized air or other gas. This pressurized gas is used to force the material out of the tip of the syringe 48 when desired. For the gas to flow into the syringe and pressurize it, the one-way valve 52 must be opened. This is accomplished by a small bar 50 which is part of the threaded connector 44. As the connector 44 is screwed onto the barrel adapter 46, the bar 50 presses on the one-way valve 52 forcing it open. The gas flows through the one-way valve 52 into the syringe 48 but is prevented from flowing back into the hose.

Periodically it may be necessary to remove the syringe from the system in which it is mounted and disconnect it from the pressurized gas hose. This is accomplished by simply unscrewing the hose 42 from the syringe barrel adapter 46. As the bar 50 is removed from pressing on the one-way valve 52, the valve closes. The syringe 48 remains sealed, avoiding leaking and contamination of the material inside the syringe.

In another embodiment of the invention, the syringe is sealed with a flexible rubber seal instead of a one-way valve. The seal 56 is mounted inside the barrel adapter 46 which is inserted inside the syringe 48. A thin slit 55 in the top of the seal 56 can be opened to allow gas to pass through. The gas hose (not shown in these views) is connected to the barrel adapter 46 via a threaded connector 44. Mounted inside the threaded connector 44 is a cylinder 53 with a conical hole 54. When the hose is connected to the barrel adapter 46 and syringe 48, the conical hole 54 in the cylinder 53 presses on the edges of the top of the rubber seal 56, deforming the top of the seal and forcing it open (see FIGS. 15A (closed) and 15B (open)). The top of the seal 56 has protruding sections 57 only on two sides. This ensures that when the face of the conical hole 54 meets the top of the seal 56, they will only coincide in line with the slit 55 at the top of the seal 56. This force along the length of the seal 56 will cause it to open. The threaded connection 44 is then screwed onto the barrel adapter 46. When the seal 56 is open, gas can flow through and be used to force material out of the tip of the syringe 48. When the hose is disconnected and the cylinder 53 with the conical hole 54 is removed, the rubber seal 56 returns to its undeformed shape and seals automatically.

In a further embodiment of the invention (see FIGS. 16-18) a spring 58 forces a metal ball 60 against an aperture 68 sealing the syringe 48. The aperture 68 is sealed by a flexible rubber gasket 62. The spring 58 rests inside a tube 64 which is mounted in the barrel adapter 46. The tube 64 is narrow enough to prevent buckling, and horizontal motion of the ball 60 as the spring 58 is compressed. The tube 64 is also wide enough to ensure the passage of gas when the valve is open. This valve is connected to the gas hose by a threaded connector 44. Inside this connector 44 is mounted a metal sleeve 66 with a pin 67 suspended inside. The sleeve 66 has spaces for gas to pass from the hose to the valve/syringe, and the pin 67 is centered in line with the ball 60. When the hose is pressed onto the syringe the pin 67 presses on the ball 60 compressing the spring (see FIG. 18). This opens the valve allowing gas to flow through.

In another embodiment of the invention (see FIG. 19-20) the one-way valve is replaced with a flexible rubber disc 70 attached to a spring 58. The spring 58 forces the disc 70 against a hole in a tube 72 mounted inside the barrel adapter 46. The disc 70 is mounted on the end of a rod 74 which rests inside the spring 58, preventing the spring from buckling and the disc from deflecting away from the hole. Like the ball valve, there is a sleeve 76 with a pin 77 mounted inside a threaded connection 44 which is attached to the end of the gas hose. When the hose is connected the pin 77 presses down on the disc 70 (see FIG. 20), opening the seal, and allowing gas to pass into the syringe.

Thus, a sealing system for a container of a materials deposition system used in a 3D printing process allows a seal to close automatically when the container is disconnected from a gas hose or vacuum. In one embodiment, a one-way valve is inserted within a syringe barrel adapter that attaches to the syringe, the syringe serving as the materials container. In another embodiment, the one-way valve is replaced with a rubber seal that remains closed unless forced open by pressure from a conical hole inside a cylindrical part. A further embodiment replaces the one-way valve with a metal ball on a spring, which presses against an aperture sealing the syringe until forced open by the action of connecting the syringe to a gas hose. Another embodiment operates in a similar way, replacing the ball with a rubber seal. In each embodiment, the materials container is sealed off from the environment preventing contamination of a material in the container from the outside. The invention allows for simple replacement of the container because the container itself is sealed. The connection to the air hose or vacuum does not have to be overly tight and can therefore be detached easily.

Collectively, embodiments of the invention include:

Embodiment 1

A system, having a plurality of containers configured in an array to dispense material, in which the containers each have a material dispensing end, and the containers are organized within the system so that each dispensing end of each container is oriented towards a common, single deposition point. A piston is mounted on an arm, and the arm is rotatable to align the piston with mounts of each of the containers. The mounts of the containers are each translatable under actuation by the piston to a deposition position, at which the containers dispense material, and are further translatable under the influence of a biasing mechanism to return to an original position at which the containers do not dispense material. The array of containers is mounted on a stage translatable along an axis.

Embodiment 2

A system as in embodiment 1, wherein the plurality of containers are arranged in a cone shape, with their material dispensing ends each oriented towards the common, single deposition point.

Embodiment 3

A system as in any of the foregoing embodiments, wherein the mounts of the containers are translatable under actuation by the piston along respective pairs of sliders.

Embodiment 4

A system as in any of the foregoing embodiments, wherein the containers are syringes.

Embodiment 5

A system as in any of the foregoing embodiments, wherein the syringes are arranged in a cone shape, with their material dispensing ends each oriented towards the common, single deposition point.

Embodiment 6

A system as in any of the foregoing embodiments, wherein the mounts of the syringes are translatable under actuation by the piston along respective pairs of sliders.

Embodiment 7

A system as in any of the foregoing embodiments, wherein the arm has a slot therein and the system further includes a limit switch, the slot in the arm located such that when the piston is in a home position, the slot passes through the limit switch.

Embodiment 8

A system as in any of the foregoing embodiments, wherein each of the containers is received in a respective one of a plurality of holders, the holders being sized to accommodate containers of different sizes.

Embodiment 9

A method, in which material from a plurality of containers of a system is deposited towards a common, single deposition point. Each container is a member of an array and has a material dispensing end and the plurality of containers is organized within the system so that each dispensing end of each container is oriented towards the common, single deposition point. The depositing from each respective container of the plurality of containers includes: rotating a piston so as to be aligned with a mount of the respective container, actuating the piston against the mount of the respective container so as to translate the respective container to a deposition position, dispensing the material from the respective container using a pressurized gas, and translating the respective container to an original position by a biasing mechanism.

Embodiment 10

A system as in embodiment 9, wherein the array of containers is mounted on a stage translatable along an axis and the method of deposition includes translating the stage to move the containers towards the deposition point before material deposition commences.

Embodiment 11

A system as in either of embodiments 9 or 10, wherein actuating the piston against the mount of the respective container so as to translate the respective container to a deposition position includes translating the respective container along a pair of sliders to the deposition position.

Embodiment 12

A system for sealing a syringe or other container containing material for deposition includes a rod inside the syringe; a flexible cap attached to a first end of the rod, the flexible cap creating a seal with a material exit of the syringe when the rod is displaced within the syringe along an axis thereof towards the material exit; a guide positioned within the syringe and configured so as to ensure that the rod is aligned with the material exit; and a syringe cap including a gasket attached to a second end of the rod opposite the flexible cap, the gasket being mounted inside a cylindrical tube within the syringe cap forming a piston actuatable using pressurized gas introducible into the syringe via a connection mounted in the syringe cap and directable via a channel under the piston to force the piston away from the material exit, thereby to open the material exit. The syringe cap includes grooves configured to allow gas to enter a body of the syringe and force material therein contained through the material exit.

Embodiment 13

A system as in embodiment 12, wherein the syringe further includes a relief hole to allow air to exit and enter freely according to a position of the piston.

Embodiment 14

A system as in embodiment 12 or 13, wherein the syringe further includes a spring to bias the piston such that the rod and flexible cap seal the material exit in the absence of a pressurized gas introduced via the connection mounted in the syringe cap.

Embodiment 15

A system for sealing a syringe or other container containing material for deposition includes a container and adapter. The adapter is configured to fit over a first end of the container. A second end of the container is adapted as a material exit of the container. The adapter is fitted with a seal configured to close automatically when the adapter is disconnected from a gas supply.

Embodiment 16

A system as in embodiment 15, wherein the seal includes a one-way valve.

Embodiment 17

A system as in embodiment 15 or 16, wherein the seal includes a rubber seal mounted inside the adapter and is adapted to remain closed unless forced open by a portion of the adapter impinging on the seal.

Embodiment 18

A system as in any of embodiments 15-17, wherein the adapter is configured with a cylinder having a conical hole adapted to impinge upon a pair of edges of the seal, thereby forcing open a slit in a top of the seal.

Embodiment 19

A system as in embodiment 15, wherein the seal includes a metal ball on a spring, the spring biasing the ball against an aperture unless forced open by a pressurized gas from the gas supply.

Embodiment 20

A system as in embodiment 15, wherein the seal consists of a rubber seal.

Embodiment 21

A system as in embodiment 15, wherein the seal is a one-way air valve fitted in the adapter and the adapter is threaded to receive an air hose and includes a bar positioned to press upon the one-way air valve, forcing it open when a pressurized gas is introduced into the adapter via the air hose.

Embodiment 22

A system as in embodiment 21, wherein the bar includes holes to allow air to pass therethrough.

Embodiment 23

A system as in embodiment 15, wherein the seal is a flexible rubber valve mounted inside the adapter and has a thin slit in its top. An interior space of the adapter is configured to impinge upon the top of the seal, forcing the slit to open in the presence of a pressurized gas from a tube connected to the adapter.

Embodiment 24

A system as in embodiment 15, wherein the seal is a flexible rubber valve and the adaptor is configured to receive an air hose.

Embodiment 25

A system as in embodiment 15, wherein the seal is a metal ball on a spring. In the absence of a gas from the gas supply, the spring biases the ball against a rubber gasket sealing a hole within the adapter. The adapter includes a pin arranged to displace the ball and gasket from the hole in the presence of the gas from the gas supply.

Embodiment 26

A system as in embodiment 15, wherein the seal is a rubber disc. In an absence of a gas from a gas supply, the disc is biased against an aperture in the adapter by a spring. The adapter includes a pin arranged to displace the disc from the aperture in the presence of the gas from the gas supply.

Embodiment 27

A system including a plurality of containers for dispensing one or more materials. The containers each have a respective material dispensing end and a respective dispensing mechanism, and are arranged with one another about a common point of deposition with their respective material dispensing ends oriented towards the common point of deposition. Each of the containers is included within a respective mount and is translatable between an original position at which a respective container does not dispense material and a deposition position at which the respective container dispenses material when actuated by its respective dispensing mechanism.

Embodiment 28

The system as in embodiment 27, wherein each of the plurality of containers is mounted on a common stage translatable along an axis.

Embodiment 29

The system as in either of embodiments 27 or 28, wherein the plurality of containers are arranged in a cone shape, with their material dispensing ends each oriented towards the common point of deposition.

Embodiment 30

The system as in any of embodiments 27-29, wherein the containers are syringes.

What is claimed is:

1. A system, comprising a plurality of containers for dispensing one or more materials, said plurality of containers each having a respective material dispensing end and a respective dispensing mechanism, and being arranged with respect to one another about a common point of deposition with their respective material dispensing ends oriented towards said common point of deposition, each of said plurality of containers included within a respective mount and being translatable between an original position at which a respective container does not dispense material and a deposition position at which the respective container dispenses material when actuated by its respective dispensing mechanism.

2. The system of claim 1, wherein each of the plurality of containers is mounted on a common stage translatable along an axis.

3. The system of claim 1, wherein the plurality of containers are arranged in a cone shape, with their respective material dispensing ends each oriented towards the common point of deposition.

4. The system of claim 1, wherein the plurality of containers comprise syringes.

5. The system of claim 4, wherein the syringes are arranged in a cone shape, with their respective material dispensing ends each oriented towards the common point of deposition.

6. The system of claim 5, wherein each of the plurality of containers is received in a respective one of a plurality of holders, said holders being of different sizes.

* * * * *